US008019191B2

(12) United States Patent
Laurisch (10) Patent No.: US 8,019,191 B2
(45) Date of Patent: Sep. 13, 2011

(54) METHOD AND DEVICE FOR COUPLING OPTICAL WAVEGUIDES (75) Inventor: Steffen Laurisch, Grunheide (DE)

(73) Assignee: ADC GmbH, Berlin (DE)

( * ) Notice: Subject to any disclaimer, the term of this patent is extended or adjusted under 35 U.S.C. 154(b) by 0 days.

(21) Appl. No.: 12/092,715

(22) PCT Filed: Nov. 2, 2006

(86) PCT No.: PCT/EP2006/010508
§ 371 (c)(1),
(2), (4) Date: Oct. 14, 2008

(87) PCT Pub. No.: WO2007/051611
PCT Pub. Date: May 10, 2007

(65) Prior Publication Data
US 2009/0148117 A1 Jun. 11, 2009

(30) Foreign Application Priority Data
Nov. 7, 2005 (DE) .......................... 10 2005 052 882

(51) Int. Cl.
*G02B 6/00* (2006.01)
(52) U.S. Cl. ........................................ 385/135; 385/134
(58) Field of Classification Search .................... 385/135
See application file for complete search history.

(56) References Cited

U.S. PATENT DOCUMENTS

| 5,206,927 | A | * | 4/1993 | Finzel et al. ................. 385/135 |
| 5,402,515 | A | | 3/1995 | Vidacovich et al. |
| 5,430,823 | A | | 7/1995 | Dupont et al. |
| 5,511,144 | A | * | 4/1996 | Hawkins et al. ............... 385/135 |
| 5,655,044 | A | | 8/1997 | Finzel et al. |
| 5,689,606 | A | | 11/1997 | Hanssan |
| 5,946,440 | A | | 8/1999 | Puetz |
| 6,282,360 | B1 | * | 8/2001 | Milanowski et al. .......... 385/135 |
| 6,418,264 | B1 | * | 7/2002 | Hough et al. .................. 385/135 |
| 6,870,095 | B1 | * | 3/2005 | Whitted .......................... 174/481 |
| 2004/0042755 | A1 | * | 3/2004 | Vincent et al. ................. 385/135 |
| 2006/0193586 | A1 | | 8/2006 | Hoehne et al. |

FOREIGN PATENT DOCUMENTS

| DE | 27 21 300 | 11/1978 |
| DE | 69806376 | 3/2003 |
| DE | 102 55 561 | 6/2004 |
| EP | 0 479 227 | 4/1992 |
| EP | 0 715 196 | 11/1995 |

(Continued)

*Primary Examiner* — Uyen-Chau N Le
*Assistant Examiner* — Chris H Chu
(74) *Attorney, Agent, or Firm* — Merchant & Gould P.C.

(57) ABSTRACT

A device for coupling optical waveguides includes at least one element for accommodating a cartridge. The cartridge is connected to the at least one accommodating element so as to be movable relative thereto while being provided with at least one mounting element for a coupling element to which at least one of the optical waveguides and at least one other optical waveguide can be connected. The at least one accommodating element is embodied so as to accommodate only one cartridge while encompassing two guiding mechanisms which allow the at least one optical waveguide and at least one other optical waveguide to be delivered to the cartridge. The optical waveguides, which run into the at least one accommodating element from different directions, are delivered to the one cartridge via a different of the two guiding mechanisms. The optical waveguides are connected at the coupling element of the cartridge, said coupling element being disposed on the mounting element of the cartridge.

20 Claims, 5 Drawing Sheets

FOREIGN PATENT DOCUMENTS

| | | |
|---|---|---|
| EP | 1 217 411 | 6/2002 |
| EP | 1 267 192 | 12/2002 |
| EP | 1 341 020 | 9/2003 |
| EP | 1 443 603 | 8/2004 |
| GB | 2 325 531 | 11/1996 |
| JP | 63 138305 | 6/1988 |

* cited by examiner

METHOD AND DEVICE FOR COUPLING OPTICAL WAVEGUIDES

TECHNICAL FIELD

The invention relates to a device for coupling optical fibers and to a method for coupling optical fibers with the aid of such a device.

BACKGROUND

It is known to couple optical fibers in cassettes. Such cassettes for coupling optical fibers are known for example from U.S. Pat. No. 6,282,360 B1, it being possible for the optical fibers to be received by the cassettes with an excess length for a splicing reserve. The cassettes are designed in such a way that the excess lengths of the optical fibers can be received while at the same time a minimum bending radius is maintained. For access to the optical fibers in a cassette, it is known to form the cassette in such a way that it is movable in relation to a receiving element.

A device for coupling optical fibers in cassettes is also known from DE 102 55 561 A1. In a receiving element formed as a module, a number of cassettes are arranged in such a way that they can in each case be pivoted in relation to the receiving element and, in addition, are releasably connected to the receiving element. This makes it possible for the excess length or excess lengths of the optical fiber(s) received in the cassette to be unwound and for the connection of the optical fibers to be performed at a workplace specially prepared for this, which is spatially separate from the receiving element.

In the case of the known devices, the receiving element is in each case formed in a modular manner in such a way that it can receive a number of cassettes. However, the maximum number of cassettes that can be received is not variable. This means that this maximum number of cassettes that can be received is fixed when the receiving element is produced.

In the case of the known modular receiving elements, it is in each case provided that optical fibers, which are preferably led in to the receiving element by means of one or more buffered fibers, are led in largely from one direction. In the mentioned DE 102 55 561 A1, provided for this purpose is an opening which opens into a funnel-shaped channel, in which optical fibers led in by means of buffered fibers are individually separated and passed to the individual cassettes. A clearly arranged organization of individual optical fibers in the funnel-shaped channel is possible only with difficulty. In particular during servicing work, in which, following initial installation, individual optical fibers are to be exchanged or connected to different optical fibers than before, this is very disadvantageous. There is a high risk of individual optical fibers that are not specifically being worked on being damaged during such servicing work. Damage to these optical fibers is generally not noticed by the engineer carrying out the servicing, since not all the optical fibers connected to one another in all the cassettes can be checked after a servicing procedure on account of the great effort this involves.

Although a number of inlets are provided in the case of the device known from U.S. Pat. No. 6,282,360 B1, they likewise open out into a common leading-in channel, which however has a number of rudimentary guiding elements and additional guiding elements leading to the individual cassettes. Furthermore, there is a description of an embodiment in which the leading-in channel just described is formed doubly, the two leading-in channels formed being made to extend parallel to each other. A disadvantage of this embodiment is that the inner leading-in channel is covered by the outer leading-in channel, so that access to the inner leading-in channel during servicing work is in many cases impossible. In the other cases, access is at least not possible without all the optical fibers that are guided in the receiving element being greatly affected. There is consequently a high risk of optical fibers being damaged.

In the case of both known devices, it is provided that the one or more buffered fibers or the individual optical fibers are all led in to the receiving device largely from one direction. As a result, a clearly arranged and easy-to-service construction of a distributing unit in which these receiving elements are usually used together with the cassettes for coupling optical fibers is possible only with difficulty or not at all.

SUMMARY

The invention is based on the technical problem of providing a device and a method for coupling optical fibers with which a more simple, easier-to-service and more clearly arranged and more flexible construction of a distributing unit in which optical fibers are connected to one another is possible.

In a distributor or a distributing unit, an arrangement can be more clearly organized if led-in and led-away optical fibers are led in from different sides of the distributing unit of the device for coupling the optical fibers. The terms "leading in" or "led in" and "leading away" or "led away" are meant here in the mechanical sense or on the basis of a hierarchical network structure, since the transmission of information over the optical fibers generally takes place bidirectionally. The optical fibers led in from one side are consequently regarded as led-in optical fibers and the optical fibers mechanically guided on the other side of the distributor are regarded as led-away optical fibers. It is therefore envisaged according to the invention to provide a device for coupling optical fibers, comprising at least one receiving element for receiving a cassette, the cassette being connected to the at least one receiving element in such a way that it is movable in relation to it, and the cassette comprising at least one securing element for a coupling element, at which at least one of the optical fibers and at least one other of the optical fibers can be connected, the at least one receiving element being formed for receiving only the one cassette, and comprising two guiding devices, which make it possible for at least one of the optical fibers and at least one other of the optical fibers to be led in to the one cassette, the two guiding devices allowing the at least one of the optical fibers and the at least one other of the optical fibers to enter the at least one receiving element in different directions. This makes it possible that only the one cassette can be received in the at least one receiving element and the at least one of the optical fibers and the at least one other of the optical fibers are led in to the one cassette, which fibers run to the at least one receiving element from different directions, respectively via different guiding devices of the two provided, and the at least one of the optical fibers and the at least one other of the optical fibers are connected at the coupling element of the one cassette and the coupling element is arranged at the securing element of the one cassette. If, for example, one distributor is entered by a buffered fiber with a number of optical fibers which are connected to a further distributing unit and are regarded as led-in optical fibers, and by a further buffered fiber with other ones of the optical fibers, which lead to individual subscribers of an optically formed telephone network and are regarded as led-away optical fibers, the one buffered fiber and the other buffered fiber can be arranged on different sides of the distributor. The optical fibers individually separated from the two buffered fibers are then respectively led in to the at least one receiving element from different directions. During servicing of this distributing unit, searching for a specific optical fiber is made much easier. In addition to leading in the optical fibers that are used for different functions (for example on the one hand for forming a connection to a further distributing unit and on the other hand to terminating parties) from different directions, the optical fibers led to the at least one receiving unit and led away from it are led precisely to or away from the one cassette via the guiding devices. An incorrect assignment of optical fibers can be avoided more easily, so that a wrong connection or coupling of two of the optical fibers occurs more rarely or is ruled out. All the connections of the optical fibers and components used thereby for forming the connection and/or for protecting the connection are regarded as coupling elements. Securing elements may therefore be differently formed. Their purpose is to provide securement for connected optical fibers in the cassette.

An advantageous refinement of the invention provides that the guiding devices are formed as channels with respectively parallel side walls. These are designed in such a way that optical fibers are guided in the channels in such a way that the bending radius of the optical fibers does not at any point go below a minimum bending radius. In addition, the guiding channels preferably have lugs or projections under which the optical fibers can be held, so that they cannot fall out from the channels even in an arrangement in which, for example, gravitational forces act on the optical fibers. The parallel running side walls are preferably smooth and not interrupted, in order to facilitate threading in of optical fibers.

It is particularly preferred that the optical fibers enter the at least one receiving element not only from different directions but also enter it on different side faces of the receiving element. Therefore, a particularly preferred embodiment of the invention provides that each of the guiding devices comprises an opening and the openings of the guiding devices are formed on different side faces of the at least one receiving element. These may be opposite side faces or side faces which are oriented in relation to each other at an angle of 90°. For example, the side faces may be a side face and a rear face of the at least one receiving element.

In addition to permanent connections, which are formed by means of splicing optical fibers, the spliced connections of which are received in the cassettes, it is desirable for plug-in connections to be additionally provided in a distributing unit, allowing optical fibers to be coupled to one another in the distributing unit easily and quickly and releasably. Generally provided for this purpose in a distributing unit are patch fields, in which optical fibers which are provided with plug-in elements at one end can be releasably connected to one another. It is likewise possible to connect the individual optical fibers to one another in the cassettes by means of plug-in connections. It is usually provided that a led-in or led-away optical fiber is initially permanently coupled in the cassette by means of a spliced connection to a further optical fiber, which is connected at one end to a plug-in element for forming a plug-in connection. The end connected to the plug-in element must then generally be led into another cassette or to a patch field mentioned above. For a clearly arranged construction of a distributing unit, it is of advantage here if the guiding of these optical fibers can take place separately from the led-in or led-away optical fibers. Therefore, a particularly preferred embodiment of a device for coupling optical fibers provides that the at least one receiving element comprises a clearance and guiding elements, the clearance passing through the receiving element transversely in relation to guiding directions which are defined by the two guiding devices, and it being possible for the at least one receiving element to be arranged with further receiving elements, which in each case likewise comprise a clearance and guiding elements and can respectively be connected to a further cassette, to form a module in such a way that the clearances of the at least one receiving element and of the further receiving elements form a guiding channel and at least one additional one of the optical fibers, which is guided in the guiding channel, can be led in by means of the guiding elements to the one cassette of the receiving element. This means that, transversely in relation to the leading-in and leading-away of the optical fibers via the guiding devices of the at least one receiving element, there is created a guiding channel that is used for guiding preferably the optical fibers which are led from one cassette into another cassette or from a cassette to the patch field. It goes without saying that it is similarly possible to use this channel for leading optical fibers in or away and in this way separate the optical fibers if two separate buffered fibers are led in or two separate buffered fibers are led away from the distributing unit. It is similarly possible and preferred to guide in the guiding channel those optical fibers which are led between two cassettes, in order to be connected there to led-in or led-away optical fibers. The connection in the cassettes may take place by means of a permanent spliced connection or by means of a plug-in connection. The provision of the clearance in the at least one receiving element constitutes a self-evident invention. The fact that a number of the receiving elements can be arranged in a module is likewise self-evidently inventive and offers the further advantage that a distributing unit can be flexibly adapted and designed. Depending on the requirements, virtually any desired number of receiving elements with cassettes can be arranged in the distributing unit in one or more modules. In this way, it is possible for example for a module to be subsequently expanded, in that additional receiving elements which respectively enclose a cassette are added to the module or the modules. The receiving elements may be differently designed, for example adapted to cassettes of different sizes, which can receive a different number of optical fibers.

An embodiment in which the at least one receiving element is formed in the manner of a plate is particularly advantageous. To make a space-saving construction of a distributing unit possible, it may be provided that the clearance in the at least one receiving element is formed in such a way that, when a number of receiving units are arranged for forming the guiding channel, an angle other than 90° is obtained between an axis of the guiding channel and the individual guiding directions which are respectively fixed by the two guiding devices of the at least one receiving element. This allows in particular flat distributing units to be produced particularly easily.

A simple construction of the modules is made possible by the at least one receiving element being able to be connected with positive engagement to at least one of the further receiving elements by means of at least one latching connection.

It has proven to be particularly inexpensive and easy for expansion to form the at least one receiving element and the further receiving elements identically.

In order to protect the optical fibers which are guided in the guiding channel from damage and at the same time allow access to the optical fibers, for example for servicing purposes, in a development it is provided that the clearance is almost completely enclosed and on one side comprises a flexible, openable wall. The flexible, openable wall of the clearance is formed in such a way that it can preferably be easily opened with one finger. As a result, access to the optical fibers guided in the guiding channel is made possible during servicing work. Nevertheless, the optical fibers guided in the guiding channel are well protected against damage by the flexible walls and are reliably retained by them in the channel. The guiding channel or the clearances have additional openings, in order that optical fibers which are guided in the guiding channel can be led out from it and the optical fibers can be led by the guiding elements to the corresponding cassettes.

In order to make access possible to the ends of the optical fibers led in to the cassette, which are received in the cassette and are generally connected to one another, the cassette is connected to the at least one receiving element in a releasable and/or pivotable manner. It is generally advantageous to provide that the cassette is initially pivoted out from the receiving element and subsequently released from the receiving element, if appropriate, in order to bring the cassette and a connecting point at which the optical fibers are coupled to one another, preferably spliced, to a workplace. For this purpose, excess lengths of the optical fibers, which are received in the cassette, are unwound, in order to allow the cassette and the connecting point to be transported to the workplace, which is generally spatially separate from the receiving element. In the cassette, the optical fibers are guided in such a way that the bending radius cannot go below a minimum bending radius. Furthermore, it is provided that the at least one of the optical fibers and the at least one other of the optical fibers can be guided in the cassette in such a way that their ends can be connected to one another in a colinear manner at the securing element for the coupling element. The receiving element and the cassette are preferably designed in such a way that a pivoting movement of the cassette takes place about an axis which is oriented virtually perpendicular or perpendicular in relation to the guiding directions fixed by the guiding devices. In the case of a plate-like formation of the receiving element, there is a plane in which the receiving element has a maximum surface-area extent. The movement of the cassette preferably takes place in this plane or parallel to this plane.

In order to obtain both a releasable connection and a pivotable connection of the one cassette to the receiving element, in a preferred embodiment of the invention it is provided that the one cassette is connected to the at least one receiving element by means of a snap connection, about which the one cassette can be pivoted in a connected state. A snap connection can be easily released and additionally formed with a spindle, so that a pivoting movement can be performed about this spindle. Alternatively, the one cassette may be connected to the at least one receiving element by means of any desired other connection with positive engagement. A connection with positive engagement is characterized in that there is a plastically or elastically deformable element which, in a connected state, blocks one joining direction. For example, the cassette may have a ring-shaped hinge element, which can be fitted onto a cylindrical spindle located on the receiving element, with at least one flattening in a joining position. When the cassette is fitted on, a locking lug, for example, is elastically deformed. If the cassette is pivoted about the spindle, the locking lug returns to its original position and prevents the cassette from pivoting back into the joining position, in which the clearance of the ring-shaped hinge element is aligned with the at least one flattening of the spindle in such a way that the ring-shaped hinge element, and consequently the cassette, can be released from the spindle. Only if the locking lug is elastically deformed once again can the cassette consequently be moved into the joining position, in which it can be released again from the spindle. This deformation of the locking lug can preferably be achieved by exerting an increased pivoting moment.

In a preferred embodiment of the device, the module is an element of a distributing device used in communication technology, in particular telecommunication technology.

In a particularly advantageous development of the invention, the guiding elements are designed in such a way that at least one other of the optical fibers which is guided in the guiding channel in a direction opposed to a guiding direction of the at least one additional one of the optical fibers in the guiding channel can be led in to the one cassette. If it is assumed, without restricting generality, that the individual receiving elements are arranged one on top of the other to form a module, the guiding channel runs through the module from top to bottom. In this preferred embodiment, both optical fibers which enter the guiding channel from below and optical fibers which enter the guiding channel from above can be led in to the one cassette. In this case, the guiding elements are designed in such a way that the radius of curvature of the optical fibers does not go below a minimum radius of curvature. The leading in, for example, of the other of the optical fibers from "above" and of the additional optical fiber from "below" can take place simultaneously, so that for example in a distributing unit in which a patch field is respectively arranged both above and below the module, it is possible for example for two optical fibers which respectively have a plug-in element at their one end for forming a plug-in connection to be connected to each another in the upper patch field and the lower patch field in a cassette.

BRIEF DESCRIPTION OF THE DRAWINGS

The invention is explained in more detail below on the basis of a preferred exemplary embodiment with reference to the drawing, in which.

DETAILED DESCRIPTION

Figure 1:
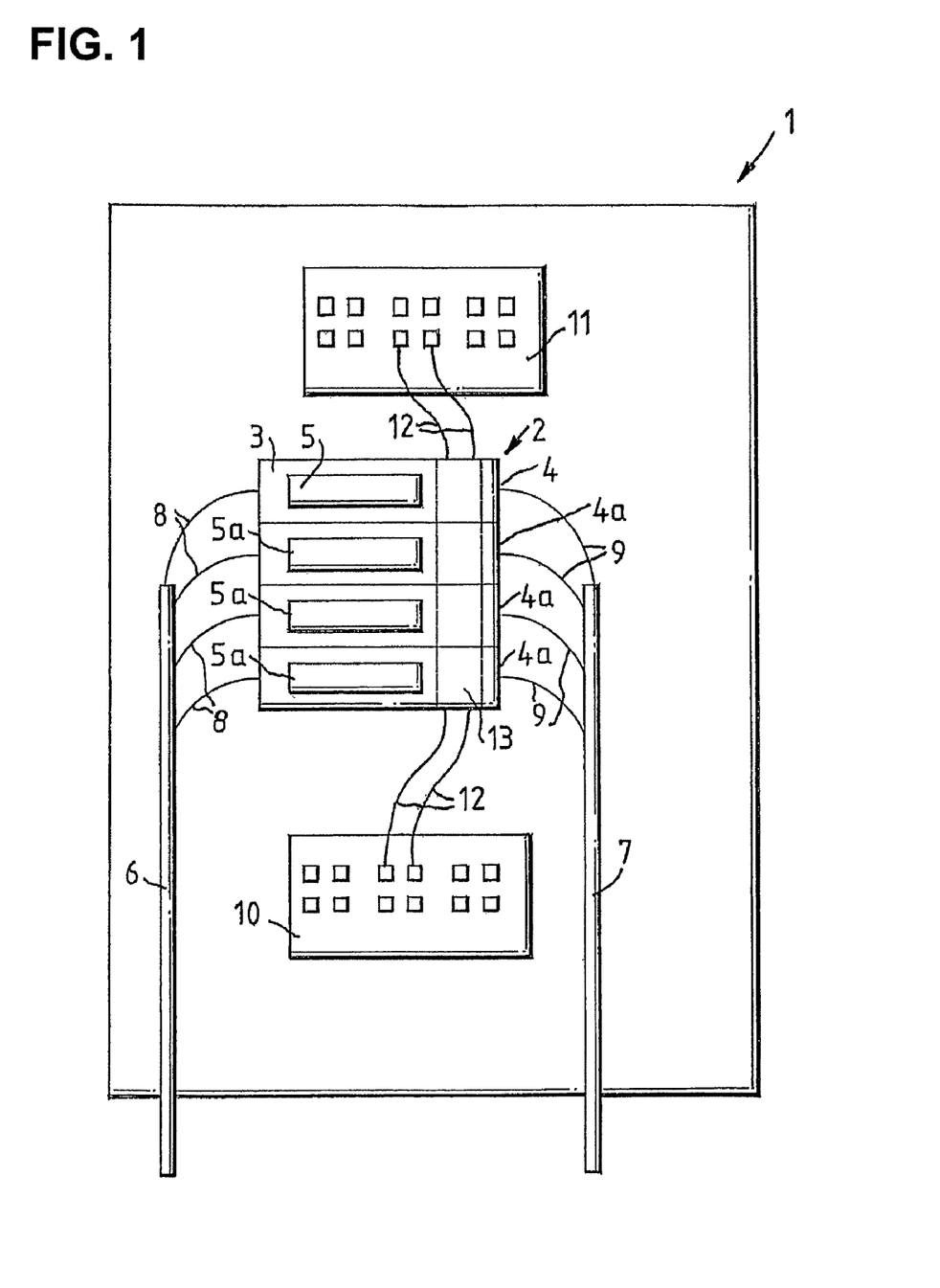
FIG. 1 shows a schematic view of a distributing unit used in communication technology.

In FIG. 1, a distributing unit 1 used in communication technology, in particular telecommunication technology, is schematically represented. Enclosed in the distributing unit 1 is a device 2 for coupling optical fibers 8, 9, 12. The device 2 comprises a module 3. The module 3 comprises at least one receiving element 4 and preferably further receiving elements 4a, which are respectively connected to precisely one cassette 5 or a further cassette 5a. The cassette 5 and the further cassettes 5a can in each case be received in the receiving elements 4 or in the further receiving elements 5a. In the distributing unit 1, optical fibers 8, 9 are led in and led away via two buffered fibers 6, 7, respectively. In another embodiment, the optical fibers may be led in to the distributing unit 1 buffered in one buffered fiber. The buffered fibers 6, 7 in each case comprise a number of the optical fibers 8, 9. In the distributing unit 1, led-in optical fibers 8, which are grouped together in the buffered fiber 6 and are, for example, connected with one end in a further telecommunication device (not represented), are directly and/or indirectly coupled to led-away optical fibers 9, which are grouped together in the buffered fiber 7 and lead for example to different terminating parties of a telecommunication network. For this purpose, the led-in optical fibers 8 are respectively led in to the receiving elements 4, 4a from one side from one direction and the led-away optical fibers 9 are respectively led away from the corresponding receiving element 4, 4a from another side in another direction. In the receiving elements 4, the led-in and led-away optical fibers 8 and 9 are respectively guided in two guiding devices to the cassettes 5, 5a, which are connected to the corresponding receiving elements 4, 4a, and guided in the cassettes 5, 5a in such a way that the ends of the led-in optical fibers 8 and of the led-away optical fibers 9 can be connected in a colinear manner at coupling elements. Excess lengths as working reserves and splicing reserves can be received in the cassettes 5, 5a. All connections of the optical fibers 9 and components used thereby for forming the connection and/or for protecting the connection are regarded as coupling elements.

The connections between the led-in optical fibers 8 and the led-away optical fibers 9 are preferably formed as permanent spliced connections at a splicing workplace. Such connections are referred to here as direct coupling or connection. However, it is similarly possible to connect the ends of the optical fibers 8, 9, 12 by plug-in elements, which in turn may form a plug-in connection. In addition, however, it is desirable to be able to connect individual led-in optical fibers 8 flexibly to other led-away optical fibers 9 in the distributing unit 1. For this purpose, patch fields 10, 11 are provided in the distributing unit. The patch fields 10, 11 are designed in such a way that so-called patch fibers 12, provided with plug-in elements, can be easily connected to one another at the patch fields 10, 11 by means of releasable connections. These connections are referred to here as indirect connections. As a result, a high degree of flexibility of the distributing unit is made possible. In order to couple optical fibers at the patch fields 10, 11, it is customary to couple the led-in or led-away optical fibers 8, 9 in one of the cassettes 5, 5a to the so-called patch fibers 12, which are connected at one end to a plug-in element. The patch fibers 12 are guided in the module 3 by a guiding channel 13, which is represented by dashed lines and is formed by clearances in the receiving elements 4, 4a. The guiding channel 13 runs transversely in relation to the leading-in directions, which are fixed by the guiding devices of the individual receiving elements 4, 4a for the led-in and led-away optical fibers 8, 9. This achieves the effect that the optical fibers performing different functions, led-in optical fibers 8, led-away optical fibers 9 and patch fibers 12, are guided in the distributing unit in such a way that they are well separated from one another. This facilitates servicing and later changing of couplings between the individual optical fibers 8, 9, 12.

Figure 2:
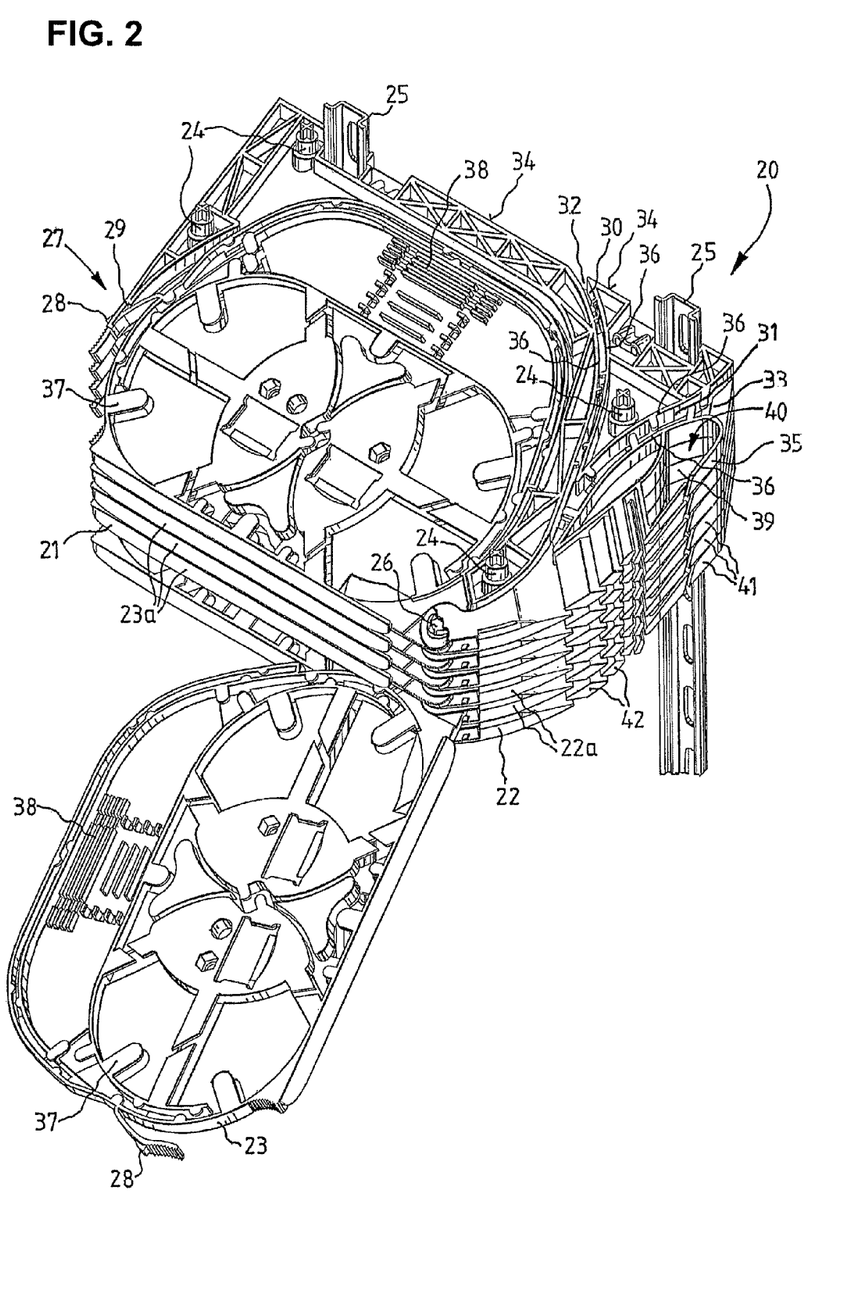
FIG. 2 shows a perspective view of an embodiment of a device for coupling optical fibers.

In FIG. 2, an isometric view of an embodiment of a device 20 for coupling optical fibers is represented. The device 20 for coupling optical fibers comprises a module 21. The module 21 comprises a receiving element 22, preferably formed in the manner of a plate. The receiving element 22 is connected to precisely one cassette 23, which can be received in a receiving element 22. The receiving element 22 and further receiving elements 22a, in which a further cassette 5a is respectively received, are connected with positive engagement by means of latching connections 24 to form the module 21. Furthermore, the receiving element 22 and the further receiving elements 22a are connected to a rail 25. The rail 25 serves the purpose of allowing the module 21 to be fastened in a distributing unit similar to that shown in FIG. 1. In the embodiment described here, the receiving element 22 and the cassette 23 are in each case formed identically to the further receiving elements 22a and further cassettes 23a, respectively.

The cassettes 23, 23a are connected to the receiving elements 22, 22a by means of a snap connection 26. The snap connections 26 are formed in such a way that the cassettes 23, 23a are pivotable about these snap connections 26. In a pivoted-out state, in which the cassette 23 is represented, the snap connection 26 can be released, so that the cassette 23 can be separated from the associated receiving element 22. In a received state, in which the cassettes 23a are in, the cassettes 23a are locked in the associated receiving elements 22a. For this purpose, the cassettes 23, 23a in each case comprise a locking mechanism 27, which comprises a resiliently mounted lug 28. These resiliently mounted lugs 28 engage in the received state in locking clearances 29 in the corresponding receiving elements 22, 22a.

Each of the receiving elements 22, 22a comprises two guiding devices 30, 31, which in each case comprise an opening 32, 33. The openings 32 of the guiding devices 30 of the receiving elements 22, 22a are in each case located in a side face 34 and the openings 33 of the guiding devices 31 are located in another side face 35. This makes it possible to guide optical fibers (not represented) that enter the receiving elements 22, 22a from different directions respectively to the cassettes 23, 23a by the guiding devices 30, 31. These different directions are preferably opposite directions. The guiding devices 30, 31 are formed in the manner of channels and comprise parallel running side walls 36. The side walls 36 are preferably formed such that they are smooth and uninterrupted. The guiding devices 30, 31 can receive both optical fibers in the form of glass fibers and insulated conductors of a cable, i.e. glass fibers provided with protection. They are preferably designed in such a way that they can receive a number of glass fibers or cable conductors. Furthermore, the guiding devices 30, 31 are designed in such a way that the bending radius of the optical fibers does not at any point in the guide go below a minimum bending radius.

The cassettes 23, 23a comprise cassette guides 37, in order to guide the optical fibers that are led in to the respective cassette 23, 23a in the cassettes 23, 23a. The cassette guides 37 are designed in such a way that excess lengths of the optical fibers can be received and the optical fibers can be guided in such a way that the ends of two optical fibers in each case can be connected in a colinear manner at securing elements 38 for coupling elements. In the exemplary embodiment represented, the cassettes 23, 23a are formed in such a way that they comprise securing elements 38 for coupling elements for receiving spliced connections for in each case four unsheathed glass fibers and/or for cable conductors. The actual configuration of the cassette guides 37 and the choice of the number and configuration of the securing elements 38 can be adapted to correspond to the respective requirements.

The receiving elements 22, 22a in each case also comprise a clearance 39, which respectively passes through the receiving elements 22, 22a. The clearances 39 of the receiving elements 22, 22a arranged against each other form a guiding channel 40, which runs transversely in relation to guiding directions which are fixed by the guiding devices 30, 31 of the receiving elements 22, 22a. The guiding directions respectively run in planes parallel to each other, which are defined by the receiving elements 22, 22a formed in the manner of plates. The guiding channel 40 runs transversely in relation to the planes formed by the plate-like receiving elements 22, 22a. The clearances 39 are in each case formed at the edge of the receiving elements 22, 22a but are almost completely enclosed. One wall of the clearances 39 is in each case advantageously formed as a flexible, openable wall 41. The guiding channel 40 is consequently closed, but can easily be at least partly opened with a finger for servicing work. In addition, the clearances 39 have openings through which the optical fibers can be led to the cassettes 23, 23a.

The receiving elements 22, 22a also comprise guiding elements 42. The guiding elements 42 of the receiving elements 22, 22a are designed in such a way that they make it possible for optical fibers which are guided in the guiding channel 40 to be led to the cassettes 23, 23a in such a way that the radius of curvature of the optical fibers does not go below a minimum radius of curvature. They are advantageously formed in such a way that both optical fibers which are led into the channel "from below" and optical fibers which are led into the channel "from above" can be led to the cassettes 23, 23a. The guiding elements 42 are designed in such a way that it is easily possible for optical fibers to be laid. The guiding elements 42 are even accessible when the receiving elements 22, 22a are latched to each other with positive engagement.

Figure 3:
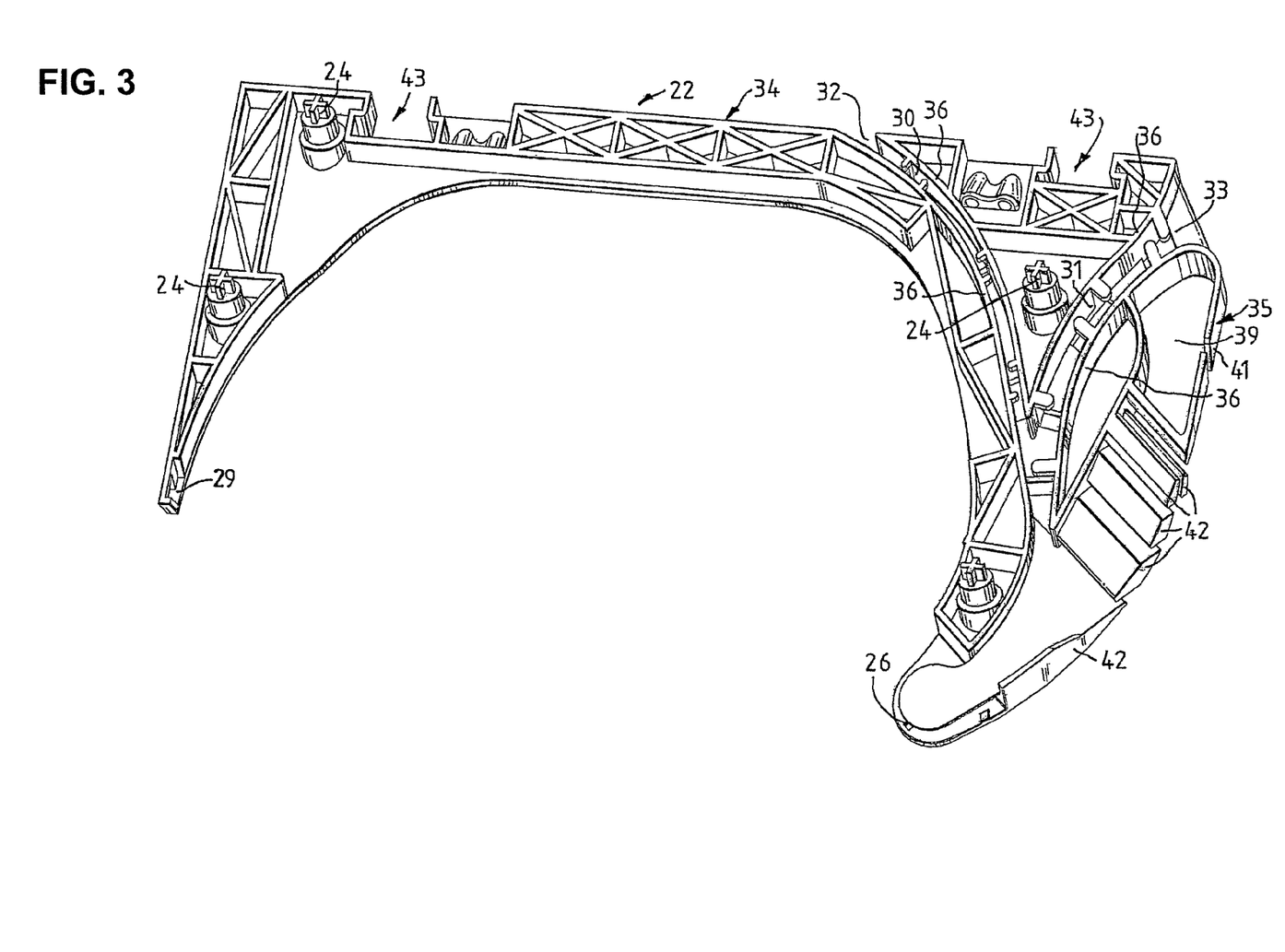
FIG. 3 shows an isometric view of a receiving element of the device for coupling optical fibers as shown in FIG. 2.

In FIG. 3, an isometric view of the receiving element 22 of the device for coupling optical fibers as shown in FIG. 2 is represented. The one cassette, assigned to the receiving element 22, has been removed from the receiving element 22 and is not represented. The same technical features are provided with the same designations in FIGS. 2 to 6. The two guiding devices 30, 31 and the clearance 39, one wall of which is formed as a flexible, openable wall 41, can be plainly seen. The locking clearance 29, in which the resiliently mounted lug of the associated cassette latches in a received position of the cassette, can also be seen. Between the guiding devices 30, 31, a rail guiding clearance 43 can be seen. The rail guiding clearance 43 is designed in such a way that it is adapted to the profile of the rail 25 as shown in FIG. 2, with which a module formed by a number of receiving elements 22 can be fastened. In the exemplary embodiment represented, the rail guiding clearance 43 is formed in such a way that the receiving element 22 can be pushed onto the rail 25 as shown in FIG. 2. An alternative configuration of the rail guiding clearance may be designed in such a way that a latching connection or snap connection with the rail can be produced.

Figures 4, 5:
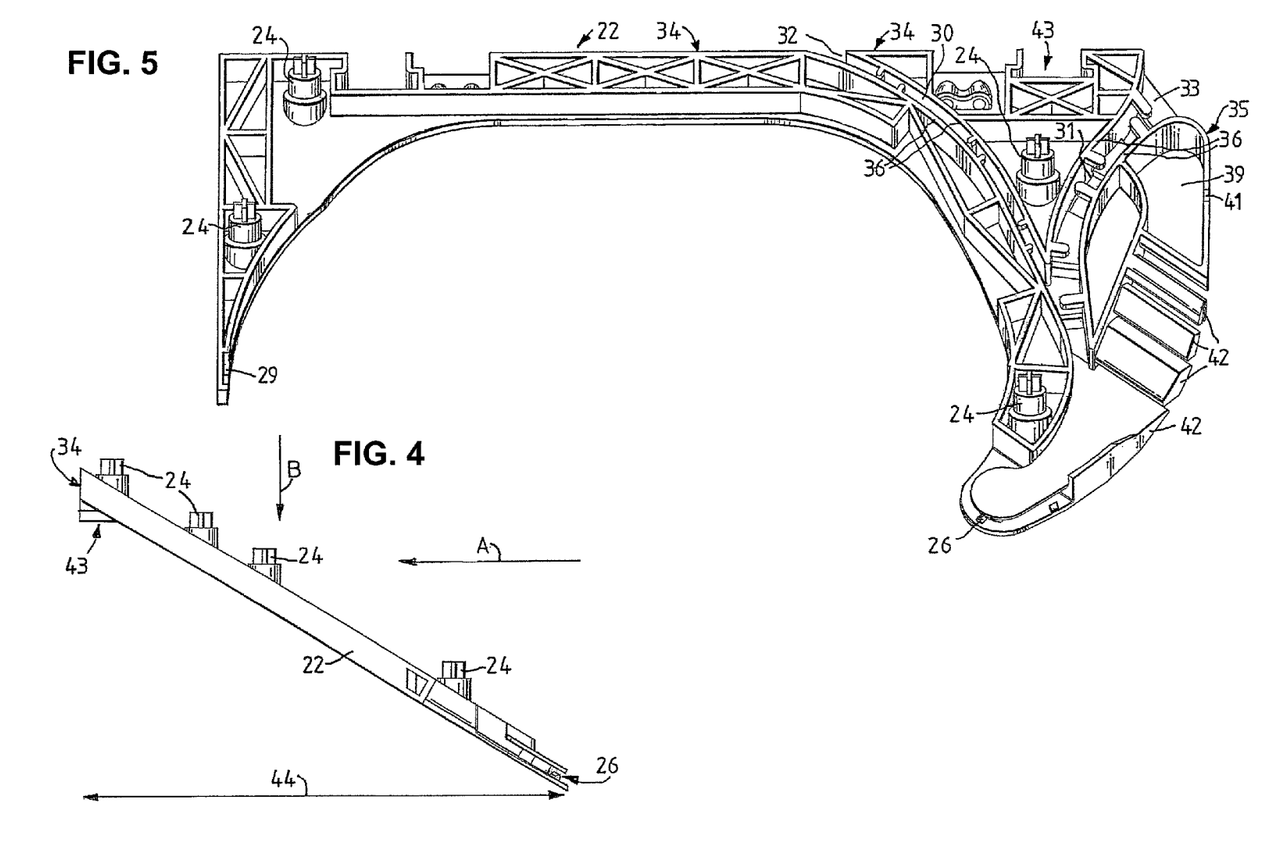
FIG. 4 shows a side view of the receiving element as shown in FIG. 3.
FIG. 5 shows a front view of the receiving element as shown in FIGS. 3 and 4 along a direction indicated in FIG. 4 by means of an arrow A.

In FIG. 4, a side view of the receiving element 22 as shown FIG. 3 is represented. The receiving element 22 is oriented in such a way that it can be pushed over a perpendicularly aligned rail for securing the receiving elements 22 joined together to form a module. This means that a plane defined by the receiving element 22 formed in the manner of a plate has an angle of inclination with respect to the rail of approximately 60°. An extent which is indicated by means of a double-headed arrow 44 is hereby reduced in comparison with an embodiment in which the angle of inclination is 90°, so that, for example, it is possible for it to be installed in a distributing unit as shown in FIG. 1, which has only a small depth.

In FIG. 5, the front view of the receiving element as shown in FIGS. 3 and 4 is represented. A viewing direction extends along an arrow A, which is represented in FIG. 4.

Figure 6:
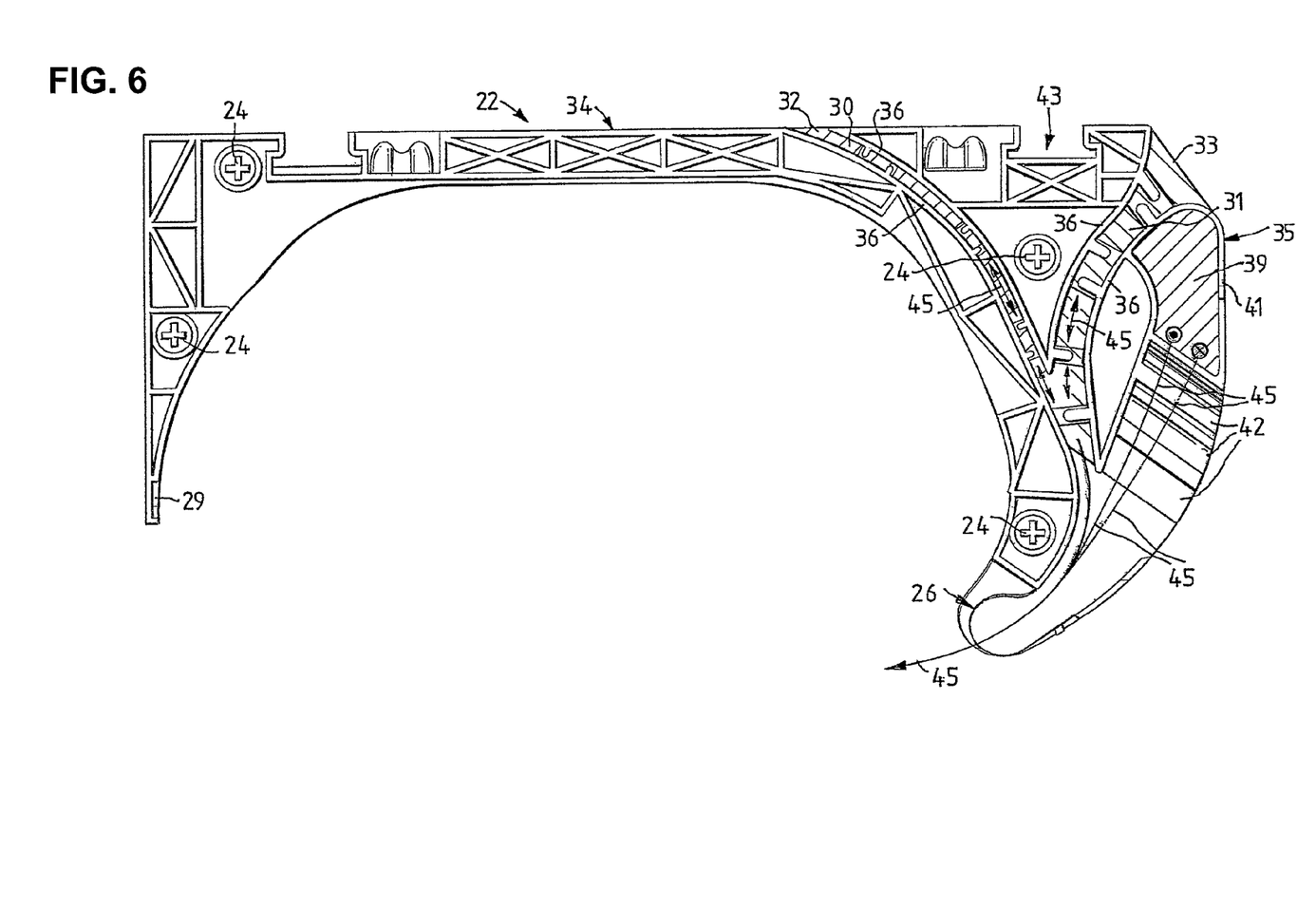
FIG. 6 shows a plan view of the receiving element as shown in FIGS. 3 to 5 along a direction indicated in FIG. 4 by means of an arrow B.

In FIG. 6, a plan view with a viewing direction along an arrow B as shown in FIG. 4 of the receiving element 22 as shown in FIGS. 3 to 5 is represented. The two guiding devices 30, 31 and the guiding channel 40 formed by the clearance 39 are hatched. The guiding directions of optical fibers are indicated by arrows 45, a point in a circle indicating out of the plane of the figure and a cross surrounded by a circle representing an arrow into the plane of the figure.

The cassettes and receiving elements are preferably in each case produced in one piece. It is preferred for them to be produced from plastic, for example by means of an injection-molding process.

Even if it is not preferred, it is possible for the optical fibers to be led into a cassette or away from it in the receiving element by one and the same of the two guiding devices or the guiding channel.

LIST OF DESIGNATIONS 1 distributing unit
2 device for coupling optical fibers
3 module
4 receiving element
4a further receiving element
5 cassette
5a further cassette
6 led-in buffered fiber
7 led-away buffered fiber
8 led-in optical fiber
9 led-away optical fiber
10 patch field
11 patch field
12 patch fiber
13 guiding channel
20 device for coupling optical fibers
21 module
22 receiving element
22a further receiving element
23 cassette
23a further cassette
24 latching connection
25 rail
26 snap connection
27 locking mechanism
28 lug
29 locking clearance
30 guiding device
31 guiding device
32 opening
33 opening
34 side face
35 other side face
36 side wall
37 cassette guide
38 securing element
39 clearance
40 guiding channel
41 flexible, openable wall
42 guiding elements
43 rail guiding clearance
44 double-headed arrow for indicating an extent
45 arrows for indicating guiding directions

The invention claimed is:

1. A device for coupling optical fibers, comprising:
a first receiving element; and
a first cassette being pivotally connected to the first receiving element at a connection location, the cassette including at least one securing element configured to retain a coupling element at which at least a first of the optical fibers and a second of the optical fibers can be coupled,
wherein the receiving element is configured to receive only the first cassette, and wherein the receiving element includes two guiding devices, which lead the optical fibers to the first cassette, the two guiding devices enabling the first and second optical fibers to enter the receiving element from different directions, the two guiding devices routing the first and second optical fibers into a common channel prior to leading the fibers onto the first cassette, the common channel extending over the connection location.

2. The device as claimed in claim 1, wherein the guiding devices are formed as channels with respectively parallel side walls.

3. The device as claimed in claim 1, wherein each of the guiding devices comprises an opening and the openings of the guiding devices are formed on different side faces of the first receiving element.

4. The device as claimed in claim 1, wherein the first receiving element comprises a clearance and guiding elements, the clearance passing through the first receiving element transversely in relation to guiding directions which are defined by the guiding devices in the first receiving element, and the device further comprising:
a plurality of further receiving elements, which in each case likewise comprise a clearance and guiding elements and can, respectively, be connected to a further cassette to form a module in such a way that the clearances of the first receiving element and of the further receiving elements form a guiding channel, and
wherein at least a third optical fiber, which is guided in the guiding channel in a guiding direction, can be led in by means of the guiding elements to the first cassette of the first receiving element.

5. The device as claimed in claim 4, wherein at least a fourth optical fiber, which is guided in the guiding channel in a direction opposed to the guiding direction, is led into the first cassette.

6. The device as claimed in claim 4, wherein the clearance is almost completely enclosed and, on one side, comprises a flexible, openable wall.

7. The device as claimed in claim 4, wherein the module is an element of a distributing device used in telecommunication technology.

8. The device as claimed in claim 1, wherein the at least one receiving element is formed in the manner of a plate.

9. The device as claimed in claim 1, wherein the at least one receiving element can be connected with positive engagement to at least one further receiving element by means of at least one latching connection.

10. The device as claimed in claim 9, wherein the at least one receiving element and the further receiving elements are identically formed.

11. The device as claimed in claim 1, wherein the first cassette is connected to the first receiving element in a releasable manner.

12. The device as claimed in claim 1, wherein the first cassette is connected to the first receiving element by means of a positively engaging connection.

13. The device as claimed in claim 1, wherein the first cassette is connected to the first receiving element by means of a snap connection, about which the first cassette is configured to be pivoted in a connected state.

14. A method for coupling optical fibers comprising:
providing a device including at least one receiving element receiving one cassette, the cassette being pivotally connected to the at least one receiving element at a connection location, and the cassette including at least one securing element for a coupling element, at which at least a first of the optical fibers and at least a second of the optical fibers can be connected, wherein the at least one receiving element is formed for receiving only the one cassette, and wherein the receiving element comprises two guiding devices, which enable the first and second optical fibers to be led into the one cassette;
leading the optical fibers onto the receiving element from different directions via the guiding devices including leading the first optical fiber into a first of the guiding devices from a first side of the receiving element and leading the second optical fiber into a second of the guiding devices from a second side of the receiving element;
leading the first and second optical fibers into a common channel on the receiving element;
leading the optical fibers from the common channel, over the connection location, into the one cassette; and
connecting the optical fibers at the coupling element, the coupling element being arranged at the securing element of the one cassette.

15. The method as claimed in claim 14, wherein each receiving element includes a clearance and guiding elements, wherein the clearance of each receiving element aligns with the clearance of each other receiving element, wherein a third of the optical fibers is led into the one cassette via a guiding channel formed by the clearances.

16. The method as claimed in claim 14, wherein two of the optical fibers are connected at a workplace which is spatially separate from the at least one receiving element, an excess length of the optical fibers being stored in the one cassette.

17. The method as claimed in claim 14, wherein, before the connection of the two optical fibers, the cassette is released from the at least one receiving device, and after the two optical fibers are connected, the cassette is subsequently connected once again to the at least one receiving device.

18. A device for coupling optical fibers comprising:
a first receiving element defining at least a first side and a second side, the first receiving element including first and second guiding devices, the first guiding device having a port opening at the first side and the second guiding device having a port opening at the second side, the second side facing a different direction than the first side; and
a first cassette being pivotally connected to the first receiving element at a connection location, the cassette including at least one securing element configured to retain a coupling element at which at least a first of the optical fibers and a second of the optical fibers can be coupled, wherein the receiving element is configured to receive only the first cassette, and
wherein the two guiding devices lead the optical fibers to the first cassette over the connection location.

19. The device as claimed in claim 18, wherein the first receiving element comprises a clearance and guiding elements, the clearance passing through the first receiving element transversely in relation to guiding directions which are defined by the first and second guiding devices in the first receiving element.

20. The device as claimed in claim 19, further comprising a plurality of further receiving elements, each of which defines a clearance and is configured to be connected to a respective further cassette, wherein the clearances of the first receiving element and of the further receiving elements form a guiding channel between the receiving elements.

* * * * *